Jan. 19, 1932. H. M. BLACK 1,841,464
CYLINDRICAL TANK FURNACE
Filed May 25, 1927   3 Sheets-Sheet 1

INVENTOR.
Harold M. Black
BY Robert D. Brown
ATTORNEY.

Jan. 19, 1932.  H. M. BLACK  1,841,464
CYLINDRICAL TANK FURNACE
Filed May 25, 1927    3 Sheets-Sheet 2

INVENTOR.
Harold M. Black
BY Robson A. Brown
ATTORNEY.

Patented Jan. 19, 1932

1,841,464

UNITED STATES PATENT OFFICE

HAROLD M. BLACK, OF BUTLER, PENNSYLVANIA, ASSIGNOR TO HARTFORD-EMPIRE COMPANY, OF HARTFORD, CONNECTICUT, A CORPORATION OF DELAWARE

CYLINDRICAL TANK FURNACE

Application filed May 25, 1927. Serial No. 194,035.

My invention relates to the manufacture of glass, particularly to the melting of the glass batch and preparation of the molten glass for subsequent frabrication into glass articles.

An object of my invention is to provide apparatus and methods for the continuous melting or fusing of batches of glass-making material continuously supplied to a furnace in which "channeling" is avoided by the continuous rotation of the melting compartment. This rotation secures a thorough mixing of the glass and provides a constant and fresh application of heat both above and below the glass, and so prevents the formation of channels.

Another object of my invention is to provide a bridge wall for a constantly rotating melting tank having suitable openings or throats, comparable with those of the non-revolving continuous tanks, and serving to prevent the forward movement of the upper and partially unmelted strata of glass, while permitting the lower and more completely melted strata to move forward toward the refining chamber and work-out end of the apparatus.

A further object of my invention is to provide suitable baffle plates in a rotary melting tank to effect a thorough mixing and stirring of the glass, whereby the refining of the glass is hastened and the homogeneity of the glass assured.

A further object of my invention is to provide a suitable refining chamber for the glass melted in the revolving chamber and to provide suitable heating means for these chambers which will efficiently and economically both melt and refine the glass.

A further object of my invention is to provide for the suitable distribution and circulation of the glass as refined to preparation chambers, from which the glass may be worked by hand or by suitable automatic machinery.

Other objects of my invention will appear from the following specification.

Figure 1:
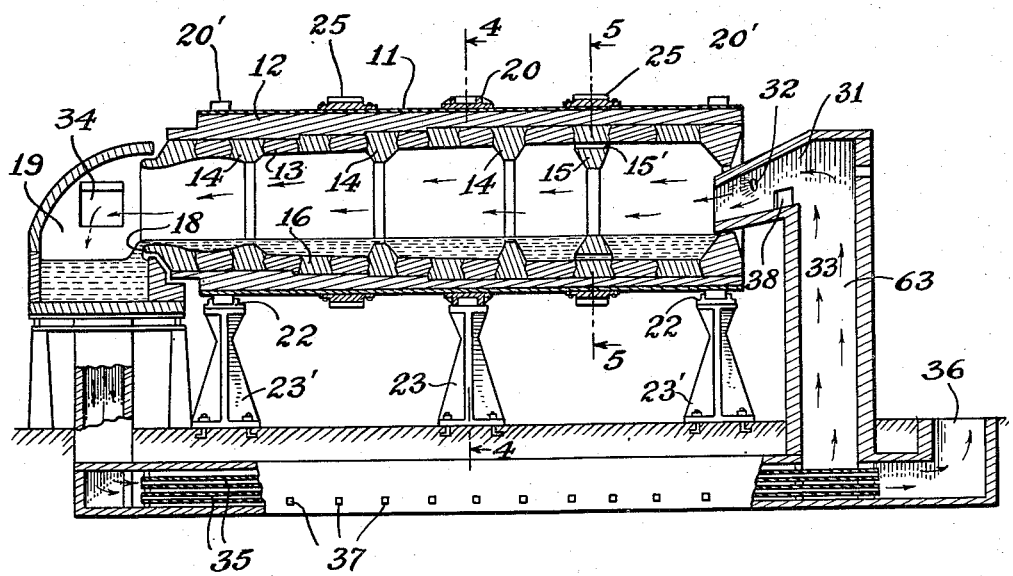
Figure 1 is a sectional elevation showing the melting compartment, the refining chamber and the heating arrangements of glass making apparatus embodying my invention.

Referring particularly to Figs. 1 to 5, inclusive; 11 represents a metal shell of cylindrical form constituting the outer wall of a cylindrical melting chamber embodying my invention; 12 is a lining of insulating material; 13, 14, 15 and 16 are refractory blocks of wedge-shaped cross section forming the interior lining of the revolving chamber. The cylindrical melting chamber is mounted for rotation upon suitable half bearing supports 23 and 23' provided with a roller carrier 22 carrying rollers 21 cooperating with metal races 20 and 20' arranged about the outer periphery of the cylindrical tank. The cylindrical tank is thus mounted for continuous rotation about its longitudinal axis and may be driven at suitable speed by any suitable driving mechanism, as for example that particularly shown in Fig. 2, which comprises a pair of peripheral ring gears 25 spaced from the metal races 20 and 20' and located on either side of the center of the tank. Meshed with these ring gears are idler gears 26 suitably mounted on bearings in stationary brackets b and which are driven by other gears 27 mounted on a shaft carying a gear 28, which latter gear is driven by a motor pinion 29 on the shaft of a motor 30.

Figure 2:
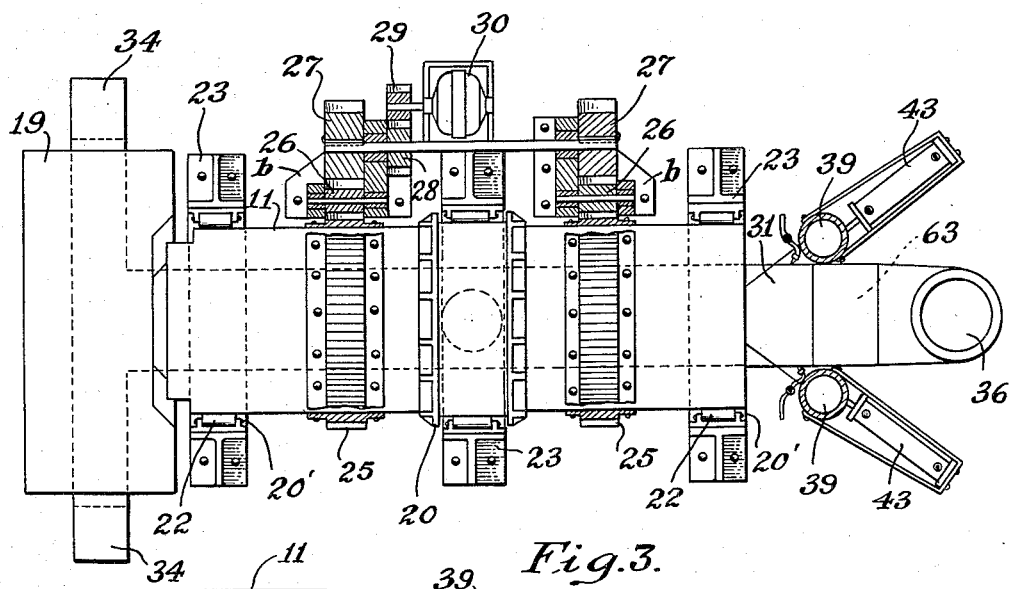
Fig. 2 is a plan view with parts in section of the apparatus of Fig. 1 showing particularly the means for rotating the melting compartment and the means for feeding the glass batch thereinto.

The driving mechanism is preferably located as shown in Fig. 2, to minimize the endwise thrust of the cylindrical tank, which endwise movement is further obviated by the provision of rollers 64 (Fig. 4) mounted in a roller carrier on the frame 23 and coacting with race 20 to oppose endwise movement of the tank.

Figure 4:
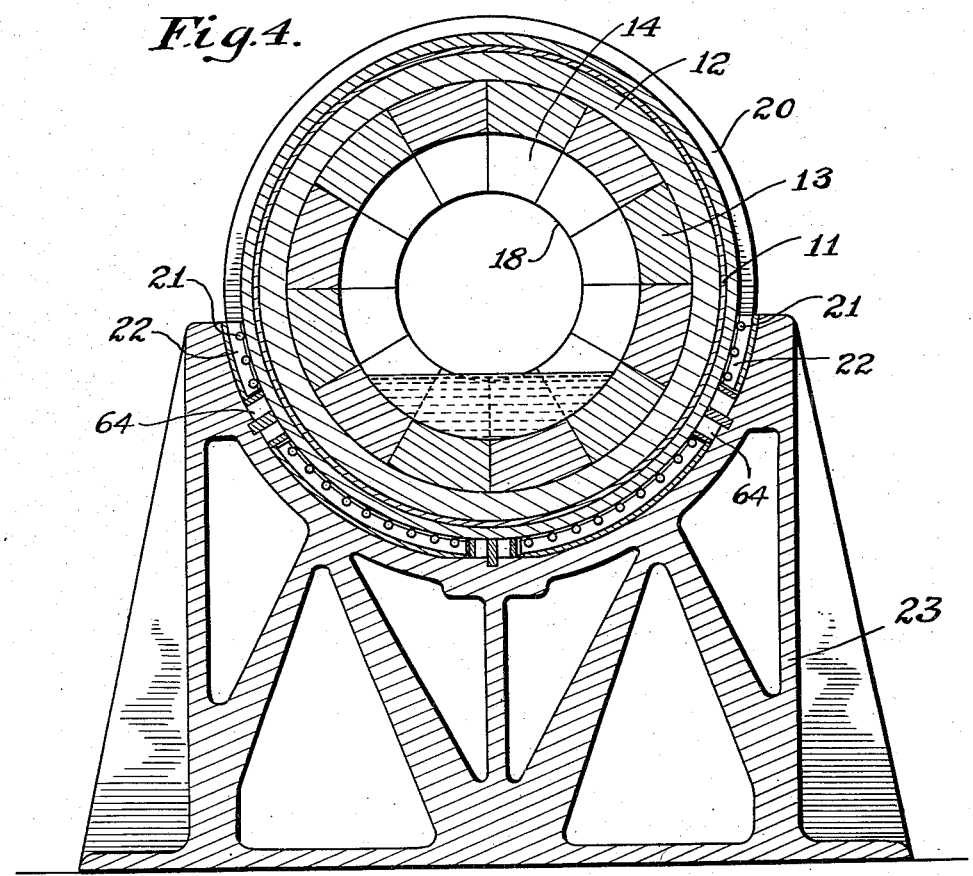
Fig. 4 is a section on the line 4—4 of Fig. 1.

The rearward end of the cylindrical tank is internally made up with blocks forming a revolving collar about a stationary spout 31 through which batch may be fed, continuously or intermittently at short periods, into the cylindrical tank by means hereafter described, and through which a combustible mixture of gas or oil and air is admitted into the cylindrical tank. The opposite or forward end of the cylindrical tank is provided with a circular lip 18 over which glass melted in the tank continuously pours into a stationary refining chamber 19, as illustrated in Fig. 1. The relation of the internal dimensions of the lip portion 18 to other portions of the tank and to the glass in the tank is illustrated in Fig. 4.

Figure 5:
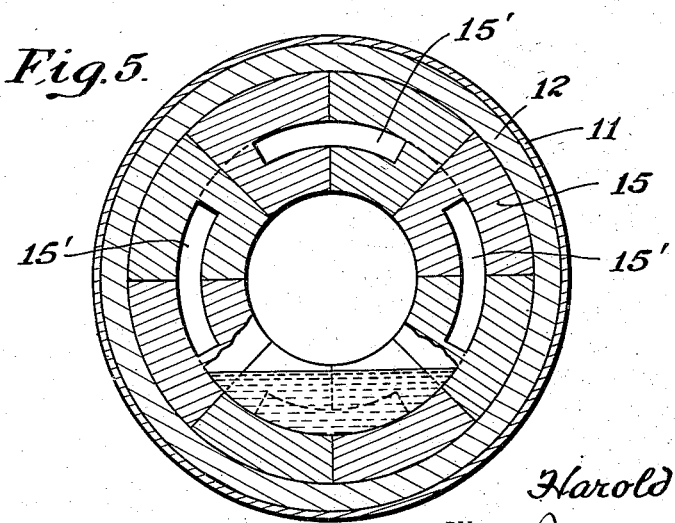
Fig. 5 is a section on line 5—5 of Fig. 1.

Somewhat forward of the rear end of the cylindrical tank an internal annular flange or bridge wall is formed, as shown in Fig. 5 by the refractory blocks 15, the flange being provided with a plurality of openings 15' which serve as throats between the rearmost portion of the cylindrical tank and the more forward portions thereof. At longitudinally spaced intervals between the throat portion and the forward end of the tank annular flanges are formed by the blocks 14, these blocks projecting upwardly into the glass but permitting the flow of glass thereover, and serving as baffles to more thoroughly and intimately mix the melted glass and to aid in the elimination of gases and included air therein.

Figure 3:
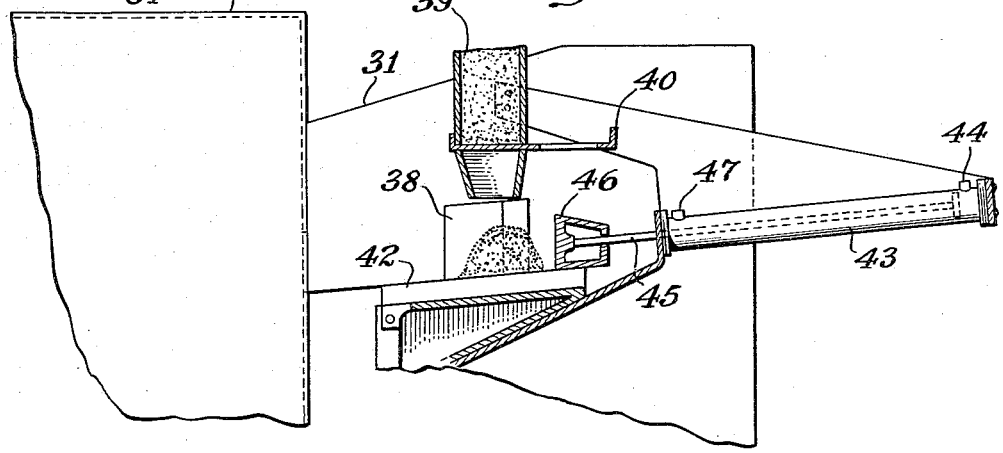
Fig. 3 is an elevation with parts in section showing a batch feeding apparatus suitable for use in the apparatus of Figs. 1 and 2.

Glass making batch is fed periodically into the tank through openings 38 and the spout 31 by any suitable means, as that illustrated in Figs. 2 and 3. Batch is contained in one or more hoppers 39 located just outside of the spout 31 and above the openings 38, from which suitable quantities of batch may be continuously or intermittently delivered onto a table or platform 42 in front of the openings, each under the control of any suitable means, as for instance the gate 40. Reciprocating pushers 46 mounted on piston rods 45 operated by the pistons of air cylinders 43 are given reciprocatory movement through and out of the openings 38 and serve to push the batch deposited on the table 42 through the openings 38 and the spout 31 into the rear end of the cylindrical tank. The pistons 43 may be reciprocated at suitable times by the alternate admission and exhaust of air to the ports 44 and 47 under the control of any suitable timing mechanism to feed the batch into the furnace at any desired time and at any desired rate.

The rotary tank may be heated in any suitable way, as for instance by the recuperative system illustrated in Fig. 1. Fuel, either gaseous or liquid, is fed into the spout 31 through port 32 and hence into the rear end of the cylindrical tank, and is mixed with preheated air passing upward through the passage 63 as indicated by the arrows 33. The products of combustion pass through the cylindrical tank into the refining chamber 19 and thence through the down-takes 34 and out of the stack 36, passing en route through the passages 35 about which air admitted at ports 37 is circulated.

Figure 6:
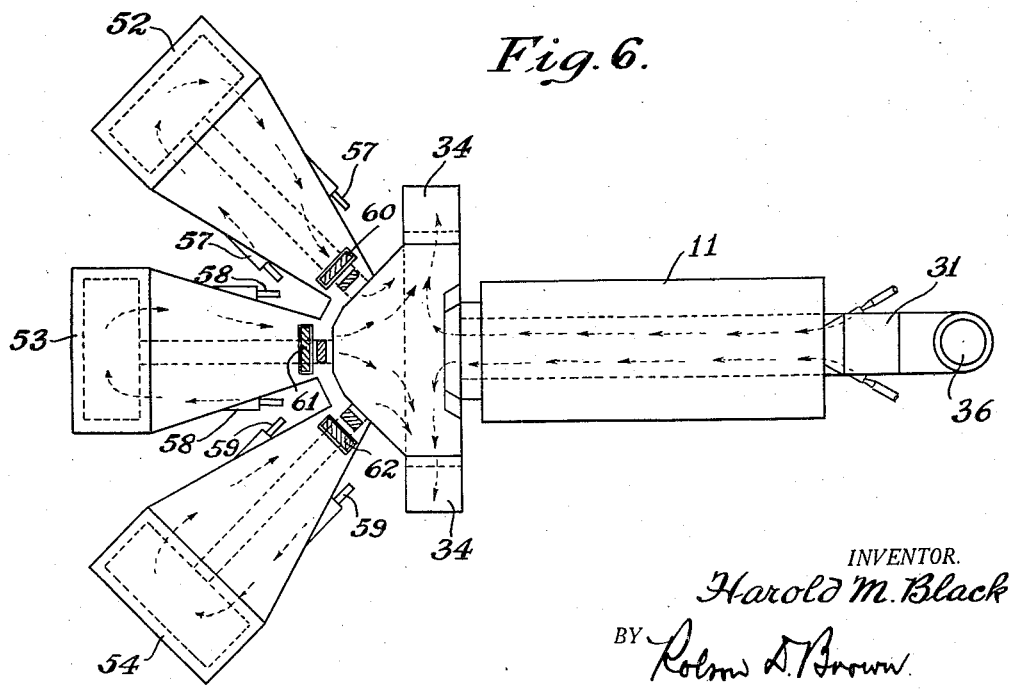
Fig. 6 is a diagrammatic plan view of the apparatus of Fig. 1, showing in addition a plurality of preparation chambers into which the glass flows from the refining chamber.

The refining chamber 19, heretofore referred to, constitutes a stationary chamber of refractory material, forming at one end a collar within which rotates the lip of the cylindrical tank, and adapted to receive the glass as it pours over the lip and to permit the completion of the refining of the glass therein. This chamber 19 may be also used as the work-out end of the furnace if so desired, in which event it should be provided above the glass line with suitable work-out holes or with suitably disposed feeder openings, or the refining chamber may be in communication, as shown in Fig. 6, with one or more preparation chambers 52, 53 and 54 so arranged and separately heated as to permit variations of temperature of glass in the several chambers. Each of these preparation chambers is provided with its separate heating means, as the burners 57, 58 and 59, and with suitable gates 60, 61 and 62 which can be separately controlled to vary the rate of flow of glass from the refining chamber into each of the preparation chambers.

By this arrangement, a comparatively small refining chamber 19 may be used with a melting tank of high melting capacity, and the glass which will necessarily pass through such a refining chamber rapidly and at a high temperature, may be separately and individually controlled as to temperature in the preparation chambers to adapt it to the particular work to be done at each of such chambers. This may be done, as the temperature of the glass in the separate chambers is the necessary result of the heat maintained within those chambers and the rate of passage of the hot glass from the refining chamber thereto. As both of these factors are separately controllable, a great variety of results may be obtained in providing in each preparation chamber glass of suitable temperature and viscosity for the particular work in hand.

The operation of the described device is as follows—Suitably mixed glass batch is loaded into the hoppers 39 and is delivered therefrom manually or automatically as desired in suitable quantities and times and to and upon the table 42 from which it is pushed by the pushers 46 into and through the spout 31 and into the rearward portion of the cylindrical tank. It is there fused by the heat directly applied to its upper surface and by the hot walls of the revolving tank, as parts of the same successively move from the upper directly heated and non-glass bearing positions to positions under the glass. It is obvious that when any one of the blocks forming the inner surface of the cylindrical tank is in a position above the glass line, it is being intensely heated by the combustion in the tank, and that as it revolves and arrives at a position below the glass line it gives off heat to the lower surface of the glass. Thus, contrary to the usual application of heat to continuous glass furnaces, the glass batch and melting glass is heated both from above and below. This is a potent factor in increasing the melting capacity of the tank over and above one which does not continuously revolve. The first step of fusion takes place in that portion of the cylindrical tank rearward of the internal annular flange 15 and possibly in part upon the end of the batch feeding passage 31. As the glass fuses more completely, it becomes denser and is brought to the bottom of the mass in this portion of the tank, from whence it moves through the throat openings in the blocks 15 and forward over the baffle blocks 14 and the lip 18, the process of melting becoming more and more complete as the glass advances. The glass then pours over the lip into the stationary refining tank 19 where the plaining or refining process is completed. It is preferred that the chamber 19 be used only for refining and distribution of the refined glass. The glass having been completely refined in the chamber 19 may be at a temperature too high and viscosity too low for the efficient manufacture of glassware, and is, therefore, passed under the control of the temperature conditions in and the gates associated with the chambers 52, 53 and 54 into these chambers wherein the glass from the common source may be separately and independently brought to the condition of temperature and viscosity suitable for the work at hand at that point in the apparatus.

In building such a furnace as I have described, I prefer to construct the blocks 13, 14, 15 and 16 of refractory material of high quality, such for instance as those described in U. S. patent to Paul G. Willetts No. 1,605,885 patented Nov. 2, 1926, and to thoroughly insulate these blocks from the metal shell 11 by the use of suitable insulating material.

If desired, the blocks 14, forming the baffles heretofore referred to, may be constructed in such manner as to cause a spiral movement of the glass and thus either force the glass forward or resist the natural tendency of the glass to move in that direction. The tank may be tilted if desired so that the depth of glass at the rear end of the cylindrical tank will be less than at the forward end, and in this way increase the speed of melting in the rear end of the tank.

The apparatus which I have described is capable of numerous modifications within the spirit of my invention as set forth in the appended claims, which claims are to be construed as broadly as the art will permit.

I claim:

1. Apparatus for the continuous making of glass, comprising a melting chamber of cylindrical form, means for rotating said chamber, and an annular bridge wall in said chamber.

2. Apparatus for the continuous making of glass, comprising a continuously revolving melting chamber provided with an internal annular flange extending above the glass line and having throat openings therein, means for feeding batch to one end of the chamber, and means for delivering melted glass from the other end of said chamber.

3. Apparatus for the continuous making of glass, comprising a cylindrical rotary melting chamber having a bridge wall separating the chamber into glass containing sections and having a series of successively effective throats providing communication between lower strata of the glass in said sections, means for continuously feeding batch into one section of said chamber, and means for delivering melted glass from the other section thereof.

4. In a constantly revolving glass melting tank, a bridge wall forming an internal flange in said tank, a plurality of openings in said bridge wall located adjacent the interior wall of the tank and adapted successively to form a throat below the surface of the glass to permit passage of glass from one portion of the tank to another.

5. Apparatus for the continuous melting and conditioning of glass, comprising a continuously rotating melting compartment, means for feeding batch thereto, a refining chamber, means for delivering melted glass thereto from the melting chamber, means for heating the melting chamber and refining chamber, a preparation chamber connected to the refining chamber, means for controlling the rate of flow of glass from the refining chamber to the preparation chamber, and separate means for controlling the temperature of the preparation chamber.

6. In glass-making apparatus, a continuously rotating melting chamber, means for feeding batch thereto, means for delivering melted glass therefrom, a refining and distributing chamber, means for heating the melting and refining and distributing chambers, a plurality of preparation chambers, and means individual to each preparation chamber to control the rate of flow of the glass to said chambers and to control the temperature therein.

7. In glass-making apparatus, a continuously rotating melting chamber, means for feeding batch thereto, means for delivering melted glass therefrom, a refining and distributing chamber, means for heating the melting and refining and distributing chambers, a plurality of work-out or preparation chambers, and means individual to the preparation chambers to control the flow of glass thereto.

8. In glass-making apparatus, a continuously rotating melting chamber, means for feeding batch thereto, means for delivering melted glass therefrom, a distributing chamber, means for heating the melting and distributing chambers, a plurality of work-out or preparation chambers, and individual means for controlling the temperature in said preparation chambers.

9. The method of making glass, which comprises continuously feeding glass batch into a melting chamber, heating the glass and the chamber, preventing the forward movement of the upper strata of the glass at one point between the batch feeding end of the melting chamber and the delivery end thereof, and continuously presenting below the glass in the chamber a freshly heated portion of said chamber.

10. The method of making glass, which comprises continuously feeding glass batch into a rotating receptacle, heating the receptacle, continuously presenting a newly heated portion of the receptacle below the glass, withdrawing the lower layers of the glass in a line substantially parallel to the axis of rotation of the receptacle, then moving the upper layers of the glass over obstructions, and delivering the glass to a refining compartment.

11. The method of making glass and conditioning the same, which comprises converting glass batch into melted glass by the continuous fresh application of heat above and below the glass, stirring the glass by the rotation of the melting receptacle, passing the glass to a refining and distributing chamber, refining the glass therein, passing the refined glass at variable rates to a plurality of preparation chambers, and variably tempering the glass therein.

12. The method of making glass, which comprises charging glass-making batch into one end of a constantly rotating melting chamber, fusing the batch in such portion of the chamber, passing the glass through throats in a bridge wall in said chamber, moving the glass past baffles, and then discharging it into a stationary refining chamber.

13. Apparatus for making glass comprising a continuously revolving melting chamber, means for feeding batch into said chamber, means for melting batch within the chamber, and means within the chamber for separating the melted glass from the batch.

14. Apparatus for making glass comprising a continuously revolving melting chamber, means for feeding batch into said chamber, means for melting batch within the chamber, and means within the chamber for separating the melted glass from the batch, said means comprising an annular bridge wall in said chamber.

15. Apparatus for making glass comprising a cylindrical melting chamber having a batch-receiving end and a glass-delivery end, means for rotating said chamber, means for feeding batch thereto, and means for preventing the surface flow of glass at one point between the batch receiving end and the glass delivery end of the chamber while permitting a flow of glass at said point below the surface of said glass.

16. Apparatus for making glass comprising a cylindrical melting chamber having a batch-receiving end and a glass-delivery end, means for rotating said chamber, means for feeding batch thereto, means for preventing the surface flow of glass at one point between the batch receiving end and the glass delivery end of the chamber while permitting a flow of glass at said point below the surface, and means for preventing a bottom flow of the glass at another point between said batch feeding end and said delivery end while permitting a surface flow of the glass.

Signed at Butler, Penna., this 20th day of May, 1927.

HAROLD M. BLACK.